United States Patent [19]
Wang et al.

[11] Patent Number: 6,064,370
[45] Date of Patent: May 16, 2000

[54] Z-AXIS FLYWHEEL CONTROL OF A COMPUTER INPUT DEVICE

[75] Inventors: Arthur Wang, Keelung; Chin Huan Chien, Miaoli, both of Taiwan

[73] Assignee: KYE Systems Corp., Taiwan

[21] Appl. No.: 08/869,802

[22] Filed: Jun. 5, 1997

[51] Int. Cl.[7] .................................................. G09G 5/08
[52] U.S. Cl. ........................ 345/163; 345/156; 345/157
[58] Field of Search ................................... 345/156, 157, 345/163

[56] References Cited

U.S. PATENT DOCUMENTS 5,298,919  3/1994  Chang ..................................... 345/163
5,313,230  5/1994  Venolia et al. .......................... 345/163
5,374,942  12/1994 Gilligan et al. ......................... 345/157
5,657,051  8/1997  Liao ....................................... 345/163

*Primary Examiner*—Jeffery A. Hofsass
*Assistant Examiner*—Julie B. Lieu
*Attorney, Agent, or Firm*—Raymond Sun

[57] ABSTRACT

A Z-axis flywheel control of a computer input device, adapted to operate in a complex computer environment for handling computer file and application software selection and processing, includes a flywheel rotatably disposed inside the computer input device, a grating for detection the angular displacement of the flywheel representing the Z-axis movement and a position returning device for maintaining and returning the flywheel back to a default or home position.

8 Claims, 3 Drawing Sheets

Z-AXIS FLYWHEEL CONTROL OF A COMPUTER INPUT DEVICE

FIELD OF THE INVENTION

The present invention relates generally to a Z-axis control of a computer input device and more particularly to a computer input device, for instance a mouse, which uses a flywheel to achieve the Z-axis control.

BACKGROUND OF THE INVENTION

Computer input devices, such as a mouse, a tracking ball, and a touch pad, are not only designed to work with application software and to monitor the X-Y plane movement, but also provide "click" function to allow a user to do on-screen display selection. However, such an input device has to be pointed to the scrolling bar of the screen display in order to scroll the screen. Thus, the screen cursor has to be repeatedly positioned between the working area on the screen and the scrolling bar. Apparently, it is inconvenient to computer users. Further, in selecting files or application software which is not currently shown in the monitor screen, the user has to hide the present file first and then uses the push-buttons or keys of the input device to sequentially change the sub-directory with repeated "double click" action. Such a process is quite boring and tedious.

Thus in order to simplify and enhance the operation, computer input devices with another dimension of input function (referred as Z-axis control) are developed, for example the Taiwan patent application No. 84208070 filed in the name of the present inventor which, cooperating with software, allows a computer user to scroll the screen or to select desired application software no matter where the screen cursor is located.

Although computer input devices with Z-axis control are already available in the market, yet it is still desirable to provide a novel design of a computer input device with Z-axis control to meet various styles of computer users in operating the input devices. FIG. 1 shows a conventional multi-dimension computer mouse 80, wherein the Z-axis control is achieved by depressing two resilient pads provided under the middle key 81 of the computer mouse with the index finger or the middle finger and, in this case, the thumb may be used to perform control of different functions. Alternatively, the Z-axis control may be arranged on one side of the mouse to be operated by the thumb in case that the middle key of the mouse is arranged for other functions.

Further, a computer mouse is usually provided with two or three keys and, besides these keys, there is no other push-button available in the mouse. Obviously, it limits the development and exploitation of the application software under current computer environment. Thus, the present inventor has developed a computer mouse devised with a side switching device which is disclosed in Taiwan patent application No. 85201274. The present inventive computer mouse described herein may also be added with the side switching device, if needed, to further enhance the control provided by the computer mouse.

SUMMARY OF THE INVENTION

Therefore, the principal object of the present invention is to provide a Z-axis flywheel control adapted to be used in a computer input device to allow a user to process Z-axis control with thumb in selecting and processing of computer files or application software under a screen scrolling and complicated processing environment.

The Z-axis flywheel control of a computer input device in accordance with the present invention comprises a flywheel, a grating, and a position returning device. The flywheel, arranged inside the computer input device and extending above the control circuit board of the computer input device, comprises rotation support means and at least one side wing. The rotation support means is comprised of a pivot hole formed on the flywheel and a pivot axle provided on the housing of the computer input device to rotatably support the flywheel inside the computer input device with the side wing extending outside the housing of the computer input device to be accessible to rotating the flywheel. The grating has an arc configuration for detecting angular displacement of the flywheel which represents the Z-axis movement. The position returning device is to maintain and return the flywheel back to a default position after the flywheel is released from a rotation.

Another object of the present invention is to provide a Z-axis flywheel control of a computer input device which is capable of returning to the default position fast.

A further object of the present invention is to provide a Z-axis flywheel control of a computer input device which provides software designers with great flexibility in software design to more fully exploit the functions which can be provided by the input device. The computer input device may be a mouse, a tracking ball, or a touch pad.

Yet a further object of the present invention is to provide a Z-axis flywheel control of computer mouse, wherein the flywheel extends out of the mouse body at two opposite sides thereof to allow a user to use thumb and ring finger in operating the flywheel, resulting in a force balance so as to enhance the Z-axis control of the input device. Further, such a configuration also allows ready switching between a left hand user and a right hand user without any modification of the overall construction.

BRIEF DESCRIPTION OF THE DRAWINGS

The present invention will be described further in detail with reference to accompanying drawings, wherein.

DESCRIPTION OF THE PREFERRED EMBODIMENT

Figure 1:
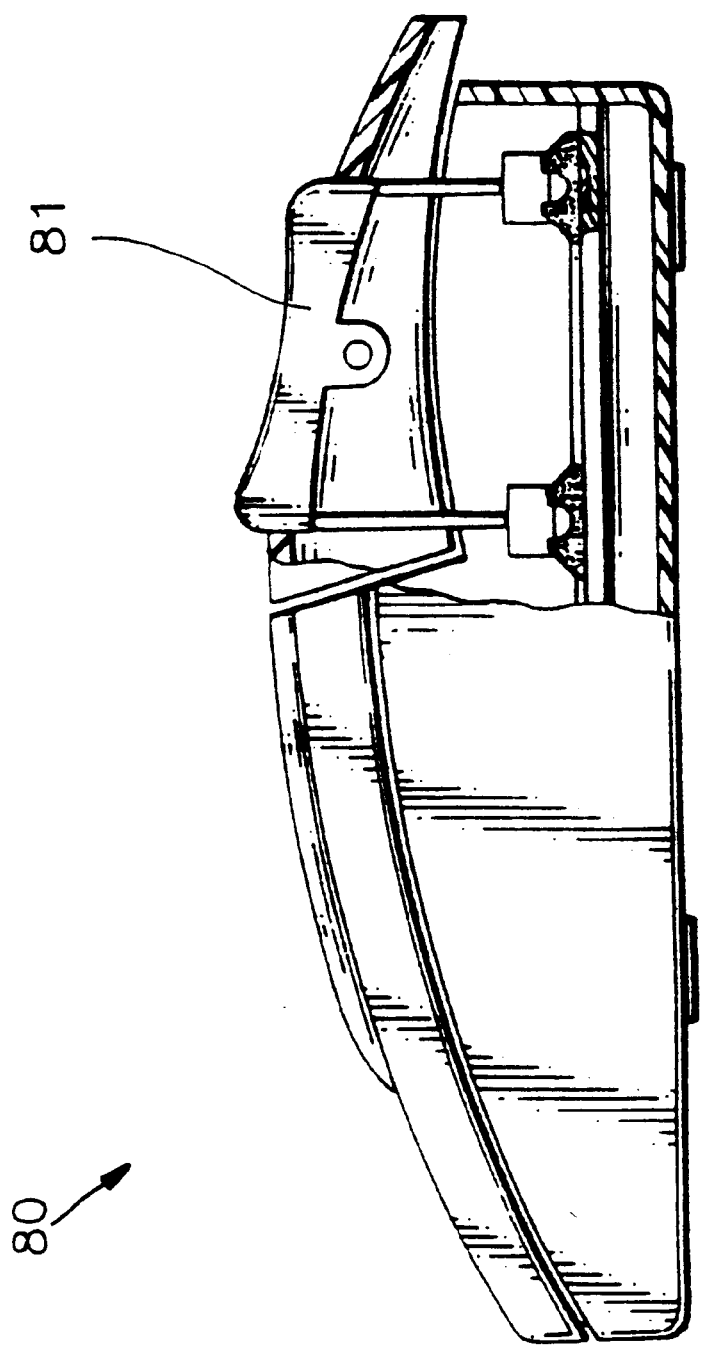
FIG. 1 is a side elevational view, partially broken, showing a computer mouse having a conventional Z-axis control.
Figure 2:
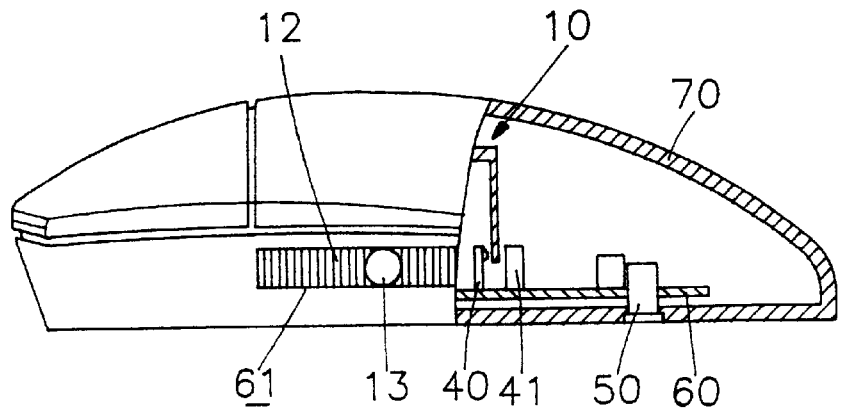
FIG. 2 is a side elevational view, partially broken, showing a computer mouse constructed in accordance with the present invention.
Figure 3:
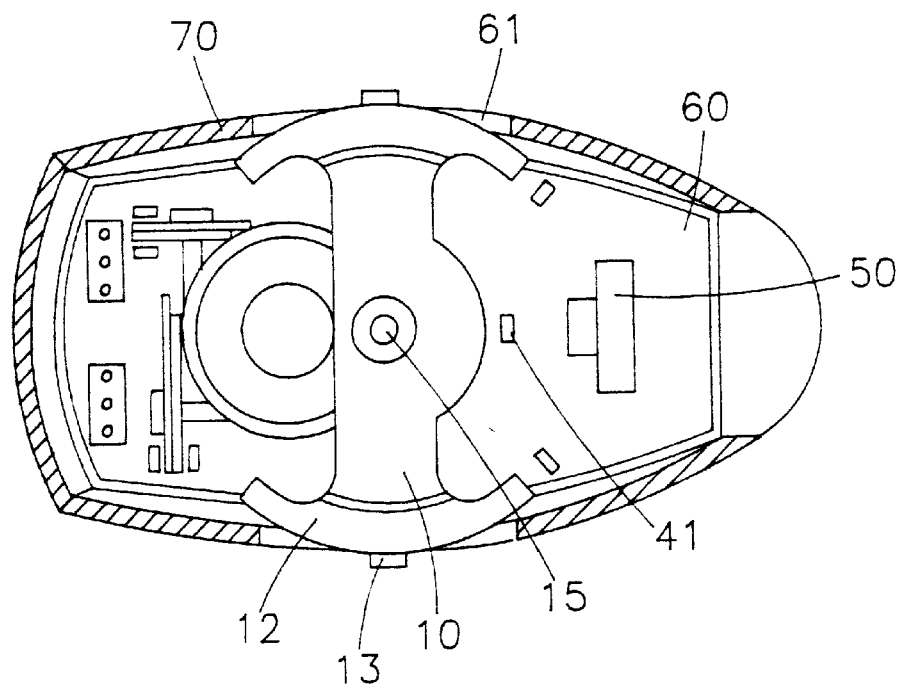
FIG. 3 is a sectional view taken on the top side of the computer mouse of the present invention.
Figure 4:
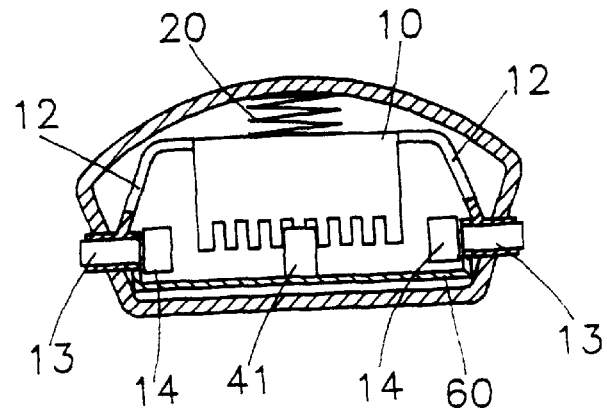
FIG. 4 is a sectional view taken on the rear side of the computer mouse of the present invention.
Figure 5:
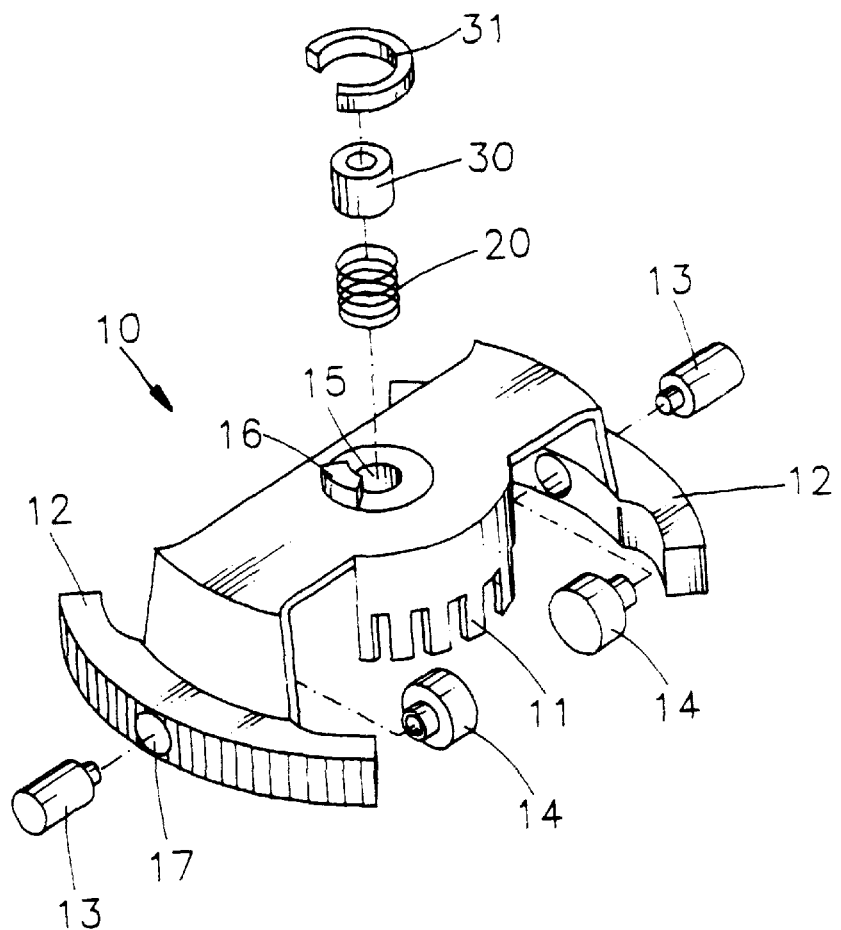
FIG. 5 is an exploded view showing the flywheel control adapted in the computer mouse of the present invention.

With reference to the drawings and in particular to FIGS. 2–4, which show a computer mouse constructed in accordance with the present invention. Also, what is shown in the drawings is for illustration only and not to limit the scope of the present invention, which should be defined by the appended claims. The computer mouse is only an example of computer input devices in which the present invention may be embodied. The computer mouse of the present invention comprises a Z-axis flywheel control mounted in an otherwise conventional computer mouse, namely a mouse that is movable on a surface defining a X-Y plane with the rolling ball or optical element to determine the X and Y coordinates of the mouse which translates into position of a cursor on computer display screen. FIG. 5 shows an exploded perspective view of the Z-axis flywheel control in accordance with the present invention to be incorporated in the computer mouse.

As shown in the drawings, the computer mouse in accordance with the present invention comprises a flywheel 10, a housing 70 which is similar in structure to that of a conventional mouse, a Z-axis detection device comprised of an emitter 40 and a receiver 41 and a return spring 20 for returning the flywheel 10 back to a default or home position.

The flywheel 10 as arranged inside the housing 70 and extend above a control circuit board 60 which is used to receive location signal of the mouse and relays the location signal to the position of a cursor on a computer display screen (not shown). The flywheel 10 comprises a top plate located above the circuit board 60 and having a pivot hole 15 formed thereon. An arc flange is provided on a front side of the plate of the flywheel 10 and extending from an edge of the plate toward the circuit board 60, but spaced from the circuit board 60 to allow ready rotation of the flywheel 10 relative to the circuit board 60. The arc flange of the flywheel 10 defines a grating 11 comprising a plurality of slots or slits extending in a direction from the plate toward the circuit board 60.

The plate of the flywheel 10 has, formed on two opposite lateral ends, two wings extending outward (i.e. away from each other) and downward (i.e. toward the circuit board 60), each having an arc end member 12 formed thereon with surface ribs formed on outside face thereof for gripping purpose. Each of the arc end members 12 is provided with a through hole 17, preferably centered along the arc of the end member 12 to be associated with a side switching device which is in electrical connection with the control circuit board 60 to perform specified function in association with specific software.

The side switching device comprises a push-button 13 which is movably received within the through hole 17 of each of the arc end members 12 of the flywheel 10 and partially extending out of the through hole 17 to be accessible by a user and a contact switch 14 which is located inboard the arc end member 12 of the flywheel 10 and corresponding to the push-button 13 to be engageable thereby so that pushing the push-button 13 makes the push-button 13 contact and activate the switch 14. The contact switch 14 is electrically connected to the control circuit board 60 to apply a signal associated with the pushing action of the push-button 13 to the circuit board 60.

The Z-axis detection device which is comprised of the emitter 40 and the receiver 41 is a detecting means for detecting angular displacement of said grating, and is arranged on the circuit board 60. The emitter 40 and the receiver 41 are arranged at two opposite sides of the grating 11 to be opposite to each other. The emitter 40 emits a signal, such as a light beam, to be received by the receiver 41. The signal is intermittently interrupted by the rotational movement of the grating 11 so that the receiver 41 receives a series of pulses. By counting the number of pulses received by the receiver 41, the angular displacement of the grating 11 of the flywheel 10 is obtained. This may be achieved by hardware provided on the circuit board 60 or by software executing in the circuit of the circuit board 60 or a combination of both hardware and software. In accordance with a preferred embodiment of the present invention, the emitter 40 is an infra-red emitter generating an infra-red beam and the receiver 41 is an infra-red receiver capable to receive the infra-red beam.

The housing 70 of the computer mouse in accordance with the present invention as in general similar to the housing of a conventional computer mouse, but is provided with a slot 61 on each of two lateral sides thereof to allow the arc end members 12 of the wings of the plate of the flywheel 10 to extend outward therethrough and also to expose and make the push-buttons 13 accessible. The housing 70 comprises a pivot axle 30 extending downward from a top side thereof, see FIG. 5, to be received and thus rotatably engage the pivot hole 15 formed on the plate of the flywheel 10 so as to allow the flywheel 10 (and thus the arc grating 11) to be rotatable about the pivot axle 30.

The housing 70 is also provided with a bottom opening to receive and expose an L/R selection switch 50 which is in electrical connection with the control circuit board 60 for alternatively activating/de-activating the push-buttons 13 on two sides of the computer mouse so as to allow the mouse to be switched between a left hand mouse or a right hand mouse.

The return spring 20 which is preferably a torsion spring is arranged between the top side of the housing 70 and the plate of the flywheel 10 with one end fixed to the pivot axle 30 provided on the top side of the housing 70 and an opposite end fixed to the pivot hole 15 formed on the plate of the flywheel 10 for the provision of a returning torque to the flywheel control 10 when the flywheel 10 is angularly displaced.

Preferably the housing 70 is provided with rotation limiting means to limit the angular displacement of the flywheel 10 about the pivot axle 30. In the embodiment illustrated, the rotation limiting means comprises a C-shaped ring 31 fit over and fixed on the pivot axle 30 and a stop 16 provided on the plate of the flywheel 10 and located to be corresponding to and movable within the opening of the C-shaped ring 31 so that by means of the contact engagement between the ring 31 and the stop 16 caused by the relative rotation between the pivot hole 15 and the pivot axle 30, a further rotation of the pivot hole 15 relative to the pivot axle 30 may be limited in both counterclockwise and clockwise directions.

Although a preferred embodiment of computer mouse in accordance with the present invention is given to describe the present invention, yet it is possible to modify and embody the present invention in other computer input devices, such as a tracking ball or a touch pad. Embodying the present invention in for example the tracking ball and touch pad is similar to that described above and modification may be needed to allow the flywheel control to be ready operated by a user in the tracking ball or touch pad embodiments.

It as apparent that although the present invention is illustrated with the description of a preferred embodiment thereof, it is contemplated that there may be changes and modifications in the described embodiment that can be carried out without departing from the scope of the invention which is intended to be limited only by the appended claims.

What is claimed is:

1. A Z-axis flywheel control of a computer input device, wherein said computer input device comprises a housing and a control circuit in a form of circuit board, said Z-axis flywheel control comprising:

a flywheel arranged inside said housing to be movable from a default position, comprising:
rotation support means for rotatably supporting said flywheel inside said housing to allow said flywheel to be angularly displaceable; and a pair of opposite side wings, extending outward of said housing and each said side wing having an individual arc end member extending out of said housing through a corresponding one of a pair of opposite side slots formed on said housing, each arc end member having a through hole formed thereon to hold and expose a side switching device which is in electrical connection with said control circuit;

a grating mounted to said flywheel to be angularly displaceable in unison therewith;

a detecting means detector for detecting angular displacement of said grating; and a positioning returning means, arranged between said housing and said rotation support means of said flywheel for maintaining and returning said flywheel back to said default position.

2. The Z-axis flywheel control of a computer input device as claimed in claim 1, wherein said side switching device comprises a push-button movably received within said hole of said arc end member of said side wing and a contact switch located in correspondence to said push-button to be engageable thereby; also said contact switch is in electrical connection with said control circuit.

3. The Z-axis flywheel control of a computer input device as claimed in claim 1, further comprising an L/R selection switch exposed outside said housing and in electrical connection with said control circuit for alternatively switching between said two side switching devices.

4. A Z-axis flywheel control of a computer input device, wherein said computer input device comprises a housing and a control circuit in a form of circuit board, said Z-axis flywheel control comprising:

a flywheel arranged inside said housing to be movable from a default position, comprising:

rotation support means for rotatably supporting said flywheel inside said housing to allow said flywheel to be angularly displaceable; and at least one side wing, having an arc end member extending out of said housing through a side slot formed on said housing, and having a through hole formed thereon to hold and expose a side switching device which is in electrical connection with said control circuit;

a grating mounted to said flywheel to be angularly displaceable in unison therewith;

a detecting means for detecting angular displacement of said grating; and a position returning means, arranged between said housing and said rotation support means of said flywheel for maintaining and returning said flywheel back to said default position.

5. The Z-axis flywheel control of a computer input device as claimed in claim 4, wherein said side switching device comprises a push-button movably received within said hole of said arc end member of said side wing and a contact switch located in correspondence to said push-button to be engageable thereby; also said contact switch is in electrical connection with said control circuit.

6. A Z-axis flywheel control of a computer input device, wherein said computer input device comprises a housing and a control circuit in a form of circuit board, said Z-axis flywheel control comprising:

a flywheel arranged inside said housing to be movable from a default position, comprising:

rotation support means for rotatably supporting said flywheel inside said housing to allow said flywheel to be angularly displaceable; and a plate, having two ends from which two side wings extend in an outward and downward inclined manner, and each said side wing having an individual arc end member partially extending out of said housing and having a through hole formed thereon to hold and expose a side switching device which is in electrical connection with said control circuit;

a grating mounted to said flywheel to be angularly displaceable in unison therewith;

a detecting means for detecting angular displacement of said grating; and a position returning means, arranged between said housing and said rotation support means of said flywheel for maintaining and returning said flywheel back to said default position.

7. The Z-axis flywheel control of a computer input device as claimed in claim 6, wherein said side switching device comprises a push-button movably received within said through hole of said arc end member of said respective side wing and a contact switch located in correspondence to said push-button to be engageable thereby; also said contact switch is in electrical connection with the control circuit.

8. The Z-axis flywheel control of a computer input device as claimed in claim 6, further comprising an L/R selection switch exposed outside said housing and in electrical connection with said control circuit for alternatively switching between said two side switching devices.

* * * * *